US009267521B2

(12) United States Patent
Baillie (10) Patent No.: US 9,267,521 B2
(45) Date of Patent: Feb. 23, 2016

(54) BATTEN JOINT FOR AN INTERNAL FLOATING ROOF OF A FLUID TANK

(75) Inventor: Robert James Baillie, Mascot (AU)

(73) Assignee: Baillie Tank Equipment Pty Ltd (AU)

( * ) Notice: Subject to any disclaimer, the term of this patent is extended or adjusted under 35 U.S.C. 154(b) by 253 days.

(21) Appl. No.: 13/363,975

(22) Filed: Feb. 1, 2012

(65) Prior Publication Data

US 2012/0193363 A1 Aug. 2, 2012

(30) Foreign Application Priority Data

Feb. 1, 2011 (AU) ................ 2011900301
Jul. 14, 2011 (AU) ................ 2011902802

(51) Int. Cl.
| B65D 88/36 | (2006.01) |
| F16B 5/00 | (2006.01) |
| B65D 88/40 | (2006.01) |
| B65D 88/34 | (2006.01) |

(52) U.S. Cl.
CPC ............. *F16B 5/004* (2013.01); *B65D 88/40* (2013.01); *Y10T 403/7062* (2015.01)

(58) Field of Classification Search
CPC ........ F16B 5/004; B65D 88/40; B65D 88/34; B65D 88/36; Y10T 403/7062; Y10T 403/7067
USPC .......................... 220/216, 218, 692, 693, 683
See application file for complete search history.

(56) References Cited

U.S. PATENT DOCUMENTS

| 3,266,207 A | | 8/1966 | Birum, Jr. | |
| 3,302,814 A | * | 2/1967 | Dohner | 220/692 |
| 3,854,269 A | * | 12/1974 | Hancock | 220/683 |
| 4,115,655 A | * | 9/1978 | Prentice | 174/368 |
| 4,546,874 A | * | 10/1985 | Kirchhan | 220/4.22 |
| 4,556,150 A | * | 12/1985 | Ikumi | 220/4.21 |
| 4,647,335 A | | 3/1987 | Wagner | |
| 4,884,715 A | * | 12/1989 | Pohlmann | 220/683 |
| 4,996,809 A | | 3/1991 | Beard | |
| 5,052,569 A | * | 10/1991 | Cooper | 220/1.5 |
| 5,394,666 A | * | 3/1995 | Zahner, III | 52/302.3 |
| 5,704,509 A | * | 1/1998 | Rosenkrantz | 220/216 |
| 6,016,632 A | | 1/2000 | McGee | |
| 8,056,289 B1 | * | 11/2011 | Konstantin | 52/204.591 |
| 2007/0175157 A1 | * | 8/2007 | Zahner, III | 52/582.2 |
| 2009/0223957 A1 | * | 9/2009 | Doxey et al. | 220/216 |
| 2012/0211491 A1 | * | 8/2012 | Yu et al. | 220/216 |

* cited by examiner

*Primary Examiner* — Mickey Yu
*Assistant Examiner* — Niki Eloshway
(74) *Attorney, Agent, or Firm* — Mayback & Hoffman, P.A.; Gregory L. Mayback (57) ABSTRACT

A batten joint for an internal floating roof of a fluid tank. The floating roof has at least a first panel having a first panel edge and a second panel having a second panel edge. The batten joint comprises a first panel retainer or retaining means adapted for retaining the first panel edge, a second panel retainer or retaining means adapted for retaining the second panel edge, and at least one batten engaging the first and second panel retainer or retaining means in a spaced apart configuration.

20 Claims, 6 Drawing Sheets

BATTEN JOINT FOR AN INTERNAL FLOATING ROOF OF A FLUID TANK

CROSS-REFERENCE TO RELATED APPLICATIONS

This application claims the priority, under 35 U.S.C. §§119 and 371, of Australian Patent Application No. 2011900301, filed Feb. 1, 2011, and Australian Patent Application No. 2011902802, filed Jul. 14, 2011; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to a batten joint for an internal floating roof of a fluid tank.

The invention has been developed primarily for use in fluid tanks and will be described hereinafter with reference to this application. However, it will be appreciated that the invention is not limited to this particular field of use.

BACKGROUND OF THE INVENTION

Existing fluid tank arrangements comprise internal floating roof arrangements. Such internal floating roof arrangements comprise a buoyant internal floating roof structure that floats on the liquid surface and greatly retards the evaporation of the volatile liquids stored in the tank. Vapors escaping from, for example, stored hydrocarbon-based liquids can present a health, safety, or fire hazard. Vapors escaping from, for example, flammable liquids can form an explosive mixture in conjunction with air. As such, internal floating roofs can be used as a safety measure to prevent explosions, asphyxiation of personnel, and to mitigate air pollution.

However, conventional floating roof arrangements suffer from several disadvantages. In one example, some existing arrangements have buoyant members that support a deck above the liquid surface. The buoyant members float on the surface of the stored liquid, leaving several inches of vapor space between the surface of the liquid and the deck, thereby creating a safety hazard as described above.

In an attempt to overcome this problem, some existing internal floating roofs are full contact floating roofs that are designed to float on the liquid directly and leave no space between the internal floating roof and the surface of the liquid. Such arrangements suffer from the disadvantage in that the joins between the one or more constituent roof panels do not provide an adequate seal, thereby allowing vapors to seep through the panel joints.

As such, a need therefore exists for an internal floating roof arrangement that provides an efficient panel joining method.

Existing internal floating roof arrangements have the further disadvantage in that it is generally difficult to control a fire that has developed at the periphery of an internal floating roof.

As such, a need therefore exists for an internal floating roof arrangement that provides measures for controlling a fire at the periphery of the internal floating roof.

Further still, existing internal floating roof arrangements suffer from the disadvantage in the lack of attachment measures. For example, where existing internal floating roof arrangements comprise access apertures, for example, for drawing fluid samples, it is generally difficult to attach an appurtenance to cover the aperture(s) or a lid to selectively seal the apertures.

As such, a need therefore exists for an internal floating roof arrangement comprising attachment measures for fastening various appurtenances in use.

Further still, existing internal floating roof arrangements suffer from the disadvantage on account of manufacture tolerances of the one or more panels of the floating roof, resulting in a floating roof that may be distorted, or an ill fit to the space provided.

It is to be understood that, if any prior art information is referred to herein, such reference does not constitute an admission that the information forms part of the common general knowledge in the art, in Australia or any other country.

Thus, a need exists to overcome the problems with the prior art systems, designs, and processes as discussed above.

SUMMARY OF THE INVENTION

The invention provides a butt joint, device, panel aperture bracket, or batten joint for an internal floating roof of a fluid tank that overcomes the hereinafore-mentioned disadvantages of the heretofore-known devices and methods of this general type and that overcomes or substantially ameliorates at least some of the deficiencies of the prior art, or to at least provide an alternative.

According to one aspect, there is provided a batten joint for an internal floating roof of a fluid tank, the floating roof having at least a first panel having a first panel edge and a second panel having a second panel edge, the batten joint comprising:

a first panel retainer or retaining means adapted for retaining the first panel edge;

a second panel retainer or retaining means adapted for retaining the second panel edge; and one or more battens engaging the first and second panel retainers or retaining means in a spaced apart configuration.

In an exemplary embodiment, the one or more battens are two battens comprising a first batten disposed at an upper surface of the batten joint and a second batten disposed at a lower surface of the batten joint.

Advantageously, first and second panel retainers or retaining means are spaced apart in an adjustable non-abutting-type arrangement so as to be configurable to account for manufacture tolerances.

In an exemplary embodiment, the batten joint further comprises a fastener or fastening means adapted to bear the one or more battens against the first and second panel retainers or retaining means.

In an exemplary embodiment, the fastener or fastening means is disposed at least partially between the first and second panel retainers or retaining means.

Advantageously, the fastener or fastening means allow for the selective adjustment of the first and second panel retainers or retaining means.

In an exemplary embodiment, the fastener or fastening means is provided with at least one gasket to prevent the seepage of fluid between the first and second panel retainers or retaining means.

Advantageously, the provision of the gasket enhances the fluid impermeability of the batten joint.

In an exemplary embodiment, each batten comprises at least one lengthwise rib and the first and second panel retainers or retaining means comprises at least one respective corresponding rib engagement for receiving the at least one lengthwise rib therein.

Advantageously, the at least one lengthwise rib and the at least one respective corresponding rib engagement provide a secure engagement of the battens by the first and second panel retainers or retaining means.

In an exemplary embodiment, the at least one respective corresponding rib engagement is sized to allow for the moveable reception of the at least one rib therein.

In an exemplary embodiment, the at least one respective corresponding rib engagement has a width greater than width of the at least one rib.

In an exemplary embodiment, the at least one respective corresponding rib engagement is a groove.

Advantageously, the spacing between each first and second panel retainers or retaining means may be adjusted to allow for the overall dimensions of the roof panel to be configured with precision.

In an exemplary embodiment, the batten joint further comprises a gasket disposed between the at least one lengthwise rib and the at least one respective corresponding rib engagement.

Advantageously, the provision of the gasket enhances the fluid impermeability of the batten joint.

In an exemplary embodiment, the at least one lengthwise rib is a pair of lengthwise ribs.

According to another aspect, there is provided a butt joint for an internal floating roof of a fluid tank, the floating roof having at least a first panel having a first panel edge and a second panel having a second panel edge, the butt joint comprising a first butt member adapted for retaining the first panel edge, a second butt member adapted for retaining the second panel edge, and a clamp or clamping means configured to sealingly clamp the first butt member and the second butt member together.

Advantageously, the butt joint provides an internal floating roof arrangement that provides an efficient panel joining method and provides an adequate fluid seal. Further, the butt joint allows the internal floating roof to comprise one or more constituent panels. The butt joint provides a joint between the panels that is efficient and, therefore, provides an internal floating roof that prevents leakage between the panels.

In an exemplary embodiment, each butt member comprises one or more troughs, each trough providing a clamping surface for the clamp or clamping means.

Advantageously, the troughs provide security for the attachment of the clamp or clamping means to the roof panels. The troughs also allow the clamp or clamping means to be removed and attached to the internal floating roof in a simple manner.

In an exemplary embodiment, the clamp or clamping means comprises an upper clamping mechanism and a lower clamping mechanism and wherein each butt member comprises an upper surface having an upper trough for engaging the upper clamping mechanism and a lower surface having a lower trough for engaging the lower clamping mechanism.

Advantageously, clamps or clamping means are provided on opposite surfaces of the internal floating roof. Such an arrangement strengthens the internal floating roof and prevents the bending or torsion of the internal floating roof.

In an exemplary embodiment, each clamping mechanism comprises a first clamping member for engaging the first butt member and a second clamping member for engaging the second butt member, and is configurable between a clamped configuration wherein the first clamp member is adjacent to the second clamping member and a released configuration wherein the first clamping member is spaced apart from the second clamping member.

Advantageously, the clamp or clamping means comprise two configurations to aid in the attachment and removal of the clamp or clamping means. The clamp or clamping means may be configured in the released configuration for attachment to or removal from the internal floating roof and a clamped configuration clamping the roof panels together.

In an exemplary embodiment, each of the one or more troughs comprises an opening having an opening width and an interior having an interior width, the opening width being less than the interior width to provide at least one lip for retaining a clamping mechanism in position when the clamping mechanism is in the clamped configuration.

Advantageously, the lip provides mechanical security to prevent the clamp or clamping means from becoming detached from the internal floating roof.

In an exemplary embodiment, each butt member comprises a panel retainer or panel retaining means, the panel retainer or retaining means comprising a substantially C-shaped section adapted for retaining the respective panel edge therein. In an exemplary embodiment, the C-shaped section further comprises upper and lower edges each comprising an elongate recess adapted for receiving respective upper and lower portions of the panel edge therein.

Advantageously, the butt member may be attached securely to a roof panel. In this manner, the butt member and the roof panel may be manufactured separately and attached together thereafter. The C-shaped configuration provides secure measures for retaining the panel edge in that both the upper and the lower surface of the roof panel is engaged by the retainer or retaining means. Furthermore, the elongate recesses adapted for receiving respective upper and lower portions of the panel edge therein further secure the butt member to the roof panel enhancing the fluid tight interface between the butt member and the roof panel.

In an exemplary embodiment, the first butt member comprises a first panel retainer or retaining means having a first height and the second butt member comprises a second panel retainer or retaining means having a second height and the first height is greater than the second height.

Advantageously, the butt members allow for the attachment of roof panels having differing heights. For example, the outer panels of an internal floating roof may be required to have a greater height, for example for rigidity, when compared to the internal panels of the internal floating roof. As such, the butt members allow for the interface of panels having a greater height to panels having a lesser height.

In an exemplary embodiment, the first butt member and the second butt member are complimentarily shaped to define a recess adapted for at least partially accommodating a fluid seal therein. In an exemplary embodiment, the butt joint further comprises a fluid seal at least partially disposed within the recess. In an exemplary embodiment, the first and second butt members are elongate.

Advantageously, the butt joint provides a fluid-tight seal between the roof panels. The fluid-tight seal prevents the seepage of fluid between the roof panels. Furthermore, the seal may be replaced from time to time to account for the wear and tear of the fluid seal.

According to another aspect, there is provided a device for an internal floating roof of a fluid tank, the fluid tank having a fluid tank shell, the floating roof having at least one panel, the device comprising:

panel retainer or retaining means comprising a substantially C-shaped section configured for retaining the at least one panel therein; and rim attachment means configured for attaching an outer rim to the device.

In an exemplary embodiment, the C-shaped section further comprises upper and lower edges each comprising an elongate recess adapted for receiving respective upper and lower portions of the panel therein.

Advantageously, the device mitigates the escape of potentially flammable vapors at the outer rim of the internal floating roof. The outer rim provides a rim space between the outer rim and the tank shell. Such a rim space may be provided with a suitable rim seal. Furthermore, the elongate recesses adapted for receiving respective upper and lower portions of the panel therein further secure the device to the roof panel enhancing the fluid tight interface between the panel retainer or retaining means and the roof panel.

In an exemplary embodiment, the device further comprises foam dam attachment or means for attaching a foam dam to the device, the foam dam partially defining a volume between the fluid tank shell and the foam dam. In an exemplary embodiment, the foam dam attachment or attachment means is an upwardly facing trough.

Advantageously, a foam dam may be connected at a periphery of the device. The volume between the fluid tank shell and the foam dam may be filled with foam during an emergency situation, such as if a fire develops at a periphery of the internal floating roof.

In an exemplary embodiment, the foam dam comprises a base having through apertures, the base being attached at the upwardly facing trough by one or more T-bolt and nut arrangements being engaged within the upwardly facing trough and extending through the apertures.

In an exemplary embodiment, the foam dam is inclined at an angle of between 20 degrees and 70 degrees to the fluid tank shell.

Advantageously, an angle of between 20 degrees and 70 degrees defines a volume between the fluid tank shell and the foam dam that is suited for containing foam.

In an exemplary embodiment, the rim attachment or attachment means is an outwardly facing trough. In an exemplary embodiment, the outer rim has an outer rim height and the outer rim height is greater than the floating roof height.

Advantageously, the outer rim provides a rim space between the floating roof and the tank shell. The rim space may be provided with a suitable rim seal to prevent the escape of vapors from the periphery of the floating roof.

In an exemplary embodiment, the outer rim comprises inwardly projecting and substantially horizontal flanges attached at distal edges of the outer rim.

Advantageously, the flanges provide rigid lateral support for the outer rim.

In an exemplary embodiment, each trough is configured to engage one or more threaded T-bolts by insertion in a first orientation, then rotation to a second mechanical interlock orientation and securement with a complimentary threaded nut. In an exemplary embodiment, each trough comprises an opening having an opening width and an interior having an interior width, the opening width being less than the interior width to provide at least one lip for engaging the one or more T-bolts.

Advantageously, the troughs are configured for the simple yet secure connection of one or more T-bolts.

According to another aspect, there is provided a panel aperture bracket for an internal floating roof of a fluid tank, the floating roof having one or more roof panels, the panel aperture bracket defining an aperture through the floating roof, wherein the panel aperture bracket comprises a peripheral trough adapted for releasably securing one or more fasteners or fastening means at more than one point along the trough about the aperture.

Advantageously, the panel aperture bracket comprises an attachment device or attachment means for fastening items in use. For example, where the internal floating roof comprises access apertures, for example for drawing fluid samples or for a manway, the panel aperture bracket comprises an attachment device or attachment means for attaching a seal to cover the aperture or a lid to selectively seal the aperture.

In an exemplary embodiment, the peripheral trough comprises an opening having an opening width and an interior having an interior width, the opening width being smaller than the interior width to provide at least one lip for engaging the fastener or fastening means.

Advantageously, the lip provides mechanical security to prevent the fastener or fastening means from becoming detached from the internal floating roof.

In an exemplary embodiment, the panel aperture bracket has an upper surface comprising an upper peripheral trough. In an exemplary embodiment, the panel aperture bracket has a lower surface comprising a lower peripheral trough.

Advantageously, items may be attached to either side of the internal floating roof.

In an exemplary embodiment, the panel aperture bracket is substantially rectangular.

Advantageously, the panel aperture bracket is suited to internal floating roof arrangements comprising one or more constituent roof panels.

In an exemplary embodiment, the panel aperture bracket further comprises at least one panel retainer or retaining means, the panel retainer or retaining means comprising a substantially C-shaped section. In an exemplary embodiment, the C-shaped section further comprises upper and lower edges each comprising an elongate recess adapted for receiving respective upper and lower portions of a panel edge therein.

Advantageously, the panel aperture bracket may be attached securely to a roof panel. In this manner, the panel aperture bracket and the roof panel may be manufactured separately and attached together thereafter. Furthermore, the elongate recesses adapted for receiving respective upper and lower portions of a panel edge therein further secure the panel aperture bracket to the roof panel enhancing the fluid tight interface between the panel aperture bracket and the roof panel.

In an exemplary embodiment, the panel aperture bracket further comprises a support sleeve for receiving a portion of a floating roof support therein, the support sleeve being attached to the panel aperture bracket by the one or more fasteners or fastening means engaged in the trough.

In an exemplary embodiment, the panel aperture bracket further comprises a plate adapted to seal the aperture, the plate being attached to the panel aperture bracket by the one or more fasteners or fastening means engaged in the trough.

In an exemplary embodiment, the panel aperture bracket further comprises a lid adapted to selectively seal the aperture, the lid being hingedly attached to the panel aperture bracket by the one or more fasteners or fastening means engaged in the trough.

Advantageously, one or more items may be fastened to the internal floating roof in use. The one or more items may be attached and detached to the internal floating roof as necessary.

In an exemplary embodiment, the panel aperture bracket is arranged substantially in the same plane as the one or more floating roof panels.

Advantageously, the panel aperture bracket allows for the flush attachment of items to the internal floating roof.

In an exemplary embodiment, the one or more fasteners or fastening means are threaded T-bolts, inserted in the respective trough in a first orientation, then rotated to a second mechanical interlock orientation and secured with complimentary threaded nuts.

Advantageously, the T-bolts allow for the simple and efficient attachment and removal of the items.

Although the invention is illustrated and described herein as embodied in a butt joint, device, panel aperture bracket, or batten joint for an internal floating roof of a fluid tank, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

Notwithstanding any other forms which may fall within the scope of the present invention, preferred embodiments of the invention will now be described, by way of example only, with reference to the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises,"

"comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of an internal floating roof 100 for a fluid tank (not shown). Generally, the floating roof 100 is circular to suit a circular tank. However, in alternative exemplary embodiments, the floating roof 100 may be any shape. The internal floating roof 100 may comprise one or more honeycombed compartmentalized panels 105 to provide buoyancy to the internal floating roof 100.

Figure 1:
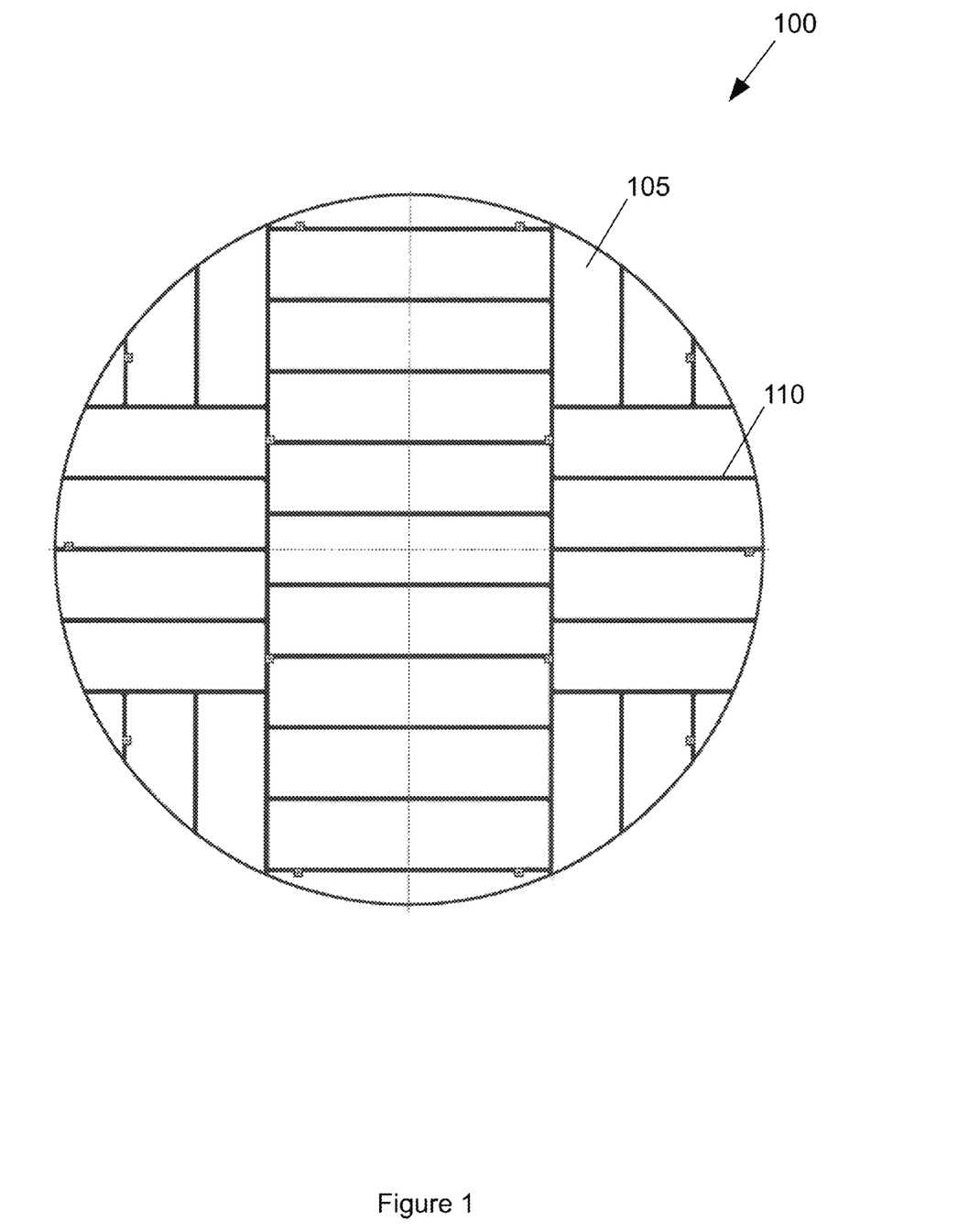
FIG. 1 is a plan view of an internal floating roof for a fluid tank in accordance with one exemplary embodiment of the present invention.

In some exemplary embodiments, the fluid tank is used in the petrochemical industry to contain petroleum or other types of hydrocarbon liquids. In the embodiments described below, the internal floating roof 100 may be used to prevent the buildup of a potentially explosive combination of oxygen and hydrocarbon in the space between the surface of the liquid and the tank roof (not shown).

The floating roof 100 comprises one or more constituent roof panels 105. The panels 105 have panel edges 110 by which the panels 105 are joined in the manner described below.

Figure 2:
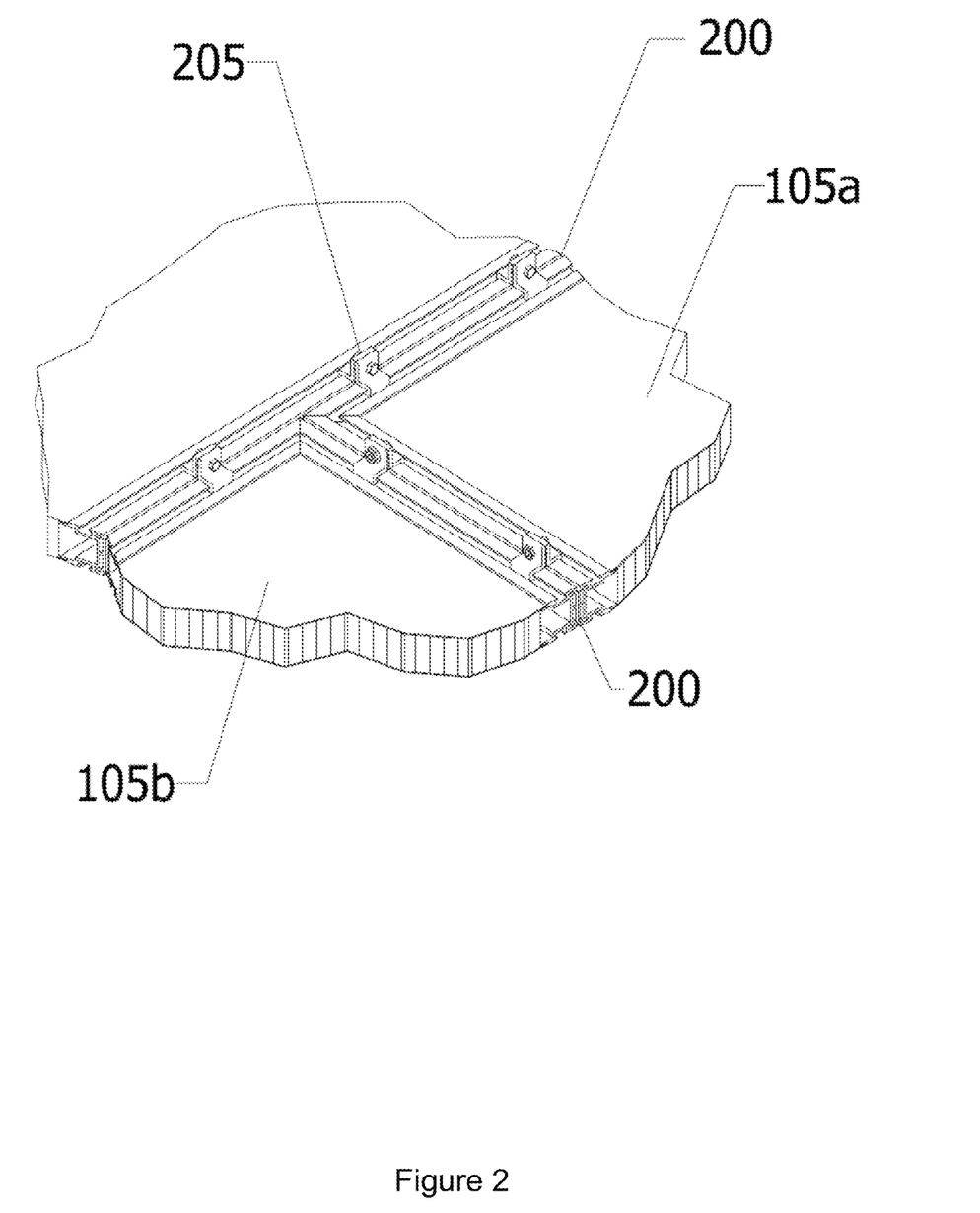
FIG. 2 an enlarged, fragmentary, perspective view of roof panels joined by a butt joint in accordance with another exemplary embodiment of the present invention.
Figure 3A:
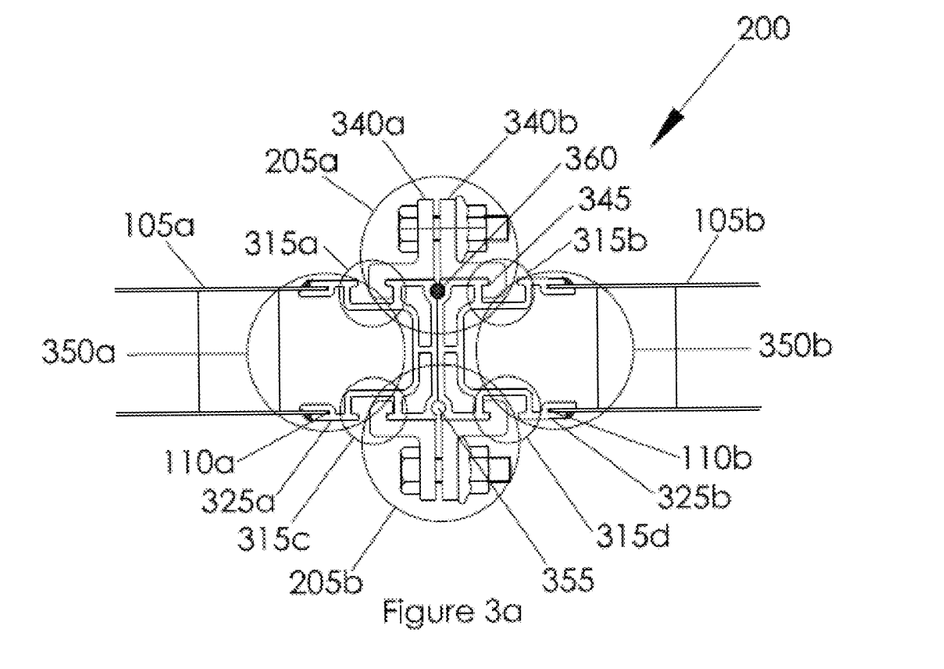
FIGS. 3a and 3b are fragmentary, cross-sectional views of a butt joint in accordance with other exemplary embodiments of the present invention.
Figure 3B:
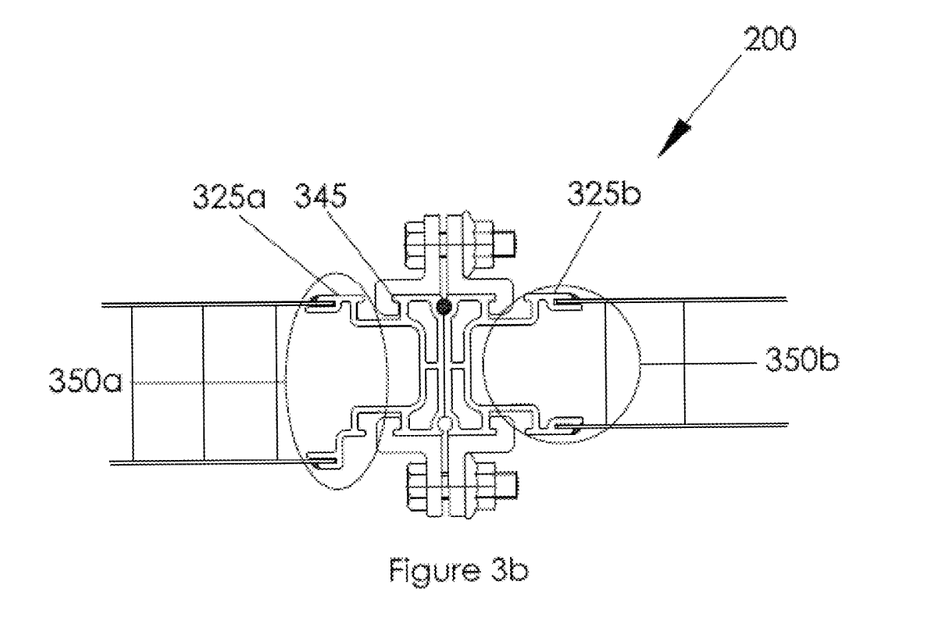

FIG. 2 shows a magnified perspective view of one exemplary embodiment by which the roof panels 105 are joined by a butt joint 200. Similarly, FIGS. 3a and 3b show cross-sectional views of the butt joint 200. The butt joint 200 is advantageously suited for floating roof applications in the manner described below.

The floating roof 100 has at least a first panel 105a having a first panel edge 110a and a second panel 105b having a second panel edge 110b. The butt joint 200 comprises a first butt member 325a adapted for retaining the first panel edge 110a and a second butt member 325b adapted for retaining the second panel edge 110b.

In one exemplary embodiment, the butt joint 200 comprises a clamp or clamping means 205 configured to sealingly clamp the first butt member 325a and the second butt member 325b together. In other exemplary embodiments, the panels 105 may be joined by other types of mechanisms.

Each butt member 325 comprises one or more troughs 315 for providing a clamping surface for the clamp or clamping means 205. Each butt member 325 may comprise any number of clamps or clamping means 205 and troughs 315, but in a preferred embodiment, the clamps or clamping means 205 comprises an upper clamping mechanism 205a and a lower clamping mechanism 205b. In this exemplary embodiment, each butt member 325 comprises an upper surface having an upper trough 315a, 315b for engaging the upper clamping mechanism 205a and a lower surface having a lower trough 315c, 315d for engaging the lower clamping mechanism 205b.

In another exemplary embodiment, each clamping mechanism 205a, 205b comprises a first clamping member 340a for engaging the first butt member 325a and a second clamping member 340b for engaging the second butt member 325b. Each clamping mechanism 205a, 205b is configurable between a clamped configuration wherein the first clamping member 340a is substantially adjacent to the second clamping member 340b and a released configuration wherein the first clamping member 340a is spaced apart from the second clamping member 340b. In this manner, one or more panels 105 may be joined by configuring the clamping mechanism 205 in its released configuration, positioning the clamping mechanism 205 about the butt joint 200 such that each clamping member 340 engages a respective trough 315 and then configuring the clamping configuration 205 in the compressed configuration to clamp the first butt member 325a and the second butt member 325b together.

In order to engage the clamping mechanism 205, each of the one or more troughs 315 comprises an opening having an opening width and an interior having an interior width. Further, the opening width is less than the interior width to provide at least one lip 345 for retaining a clamping mechanism 205 in position when the clamping mechanism 205a, 205b is in the clamped configuration.

In order to secure each panel 105 to each butt member 325, each butt member 325 comprises a panel retainer or retaining means 350. The panel retainer or retaining means 350 comprises a substantially C-shaped section adapted for retaining the respective panel edge 110 therein.

FIG. 3b shows another exemplary embodiment in which the first butt member 325a comprises a first panel retainer or retaining means 350a having a first height and the second butt member 325b comprises a second panel retainer or retaining means 350b having a second height. The first height is greater than the second height. In this manner, the butt joint 200 allows panels of differing height to be joined together. In this manner, the butt member 325 is advantageously configured to suit complimentary butt members 325 having differing heights.

In another exemplary embodiment, the butt members 205 are configured to substantially prevent fluid from seeping therethrough. In this embodiment, the first butt member 325a and the second butt member 325b are complimentarily shaped to define a recess 355 (see FIG. 3a) adapted for at least partially accommodating a fluid seal 360 therein. Furthermore, the first butt member 325a and the second butt member 325b are elongate.

Figure 4:
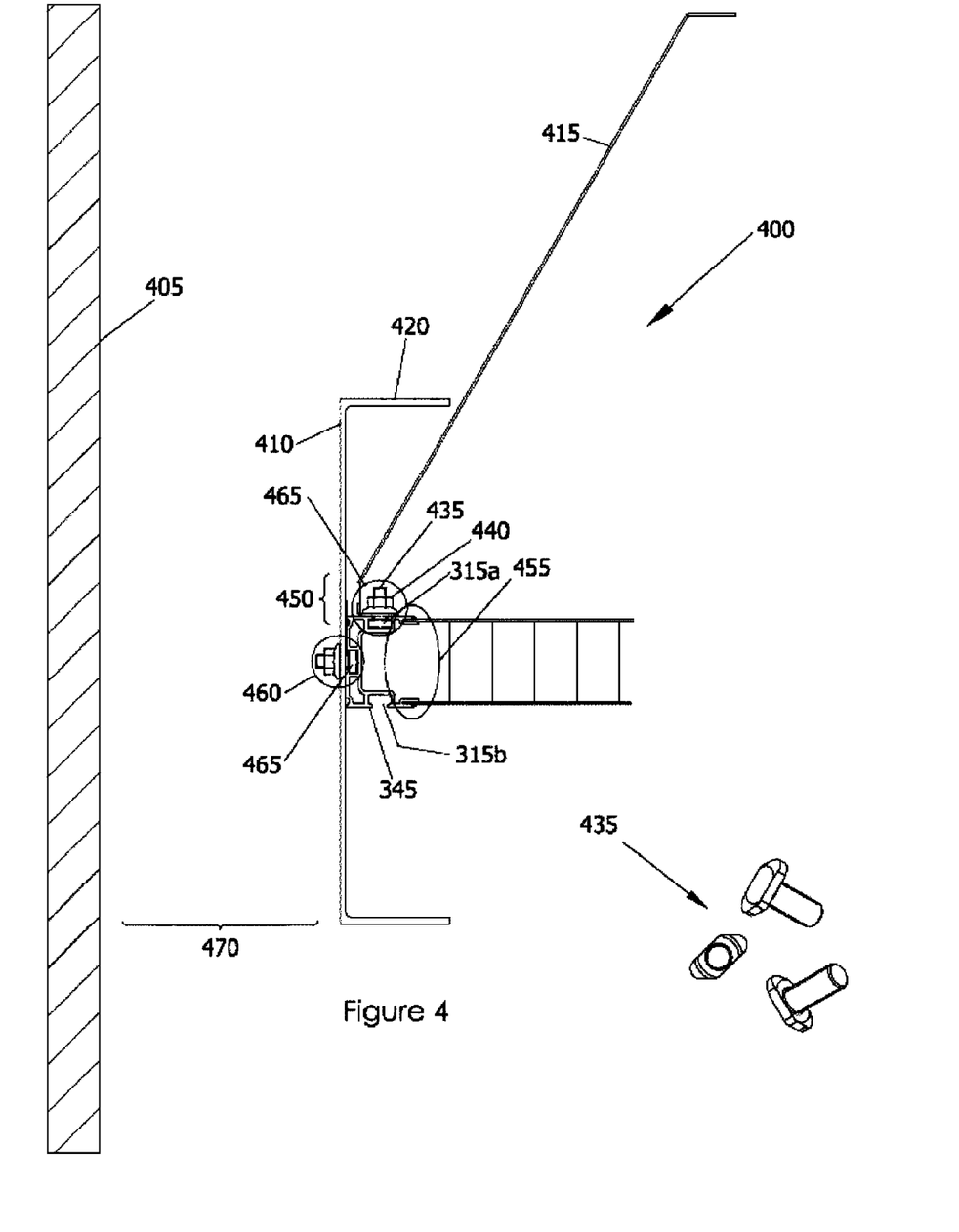
FIG. 4 is a fragmentary, cross-sectional view of a device for an internal floating roof of a fluid tank in accordance with another exemplary embodiment of the present invention.

FIG. 4 shows a device 400 for an internal floating roof 100 of a fluid tank having a fluid tank shell 405. The device comprises a panel retainer or retaining means 455 comprising a substantially C-shaped section configured for retaining at least one panel 105 therein and rim attachment or rim attachment means 460 configured for attaching an outer rim 410 to the device. In this arrangement, the rim 410 may be attached to the floating roof to provide a rim space 470 between the rim 410 and the tank shell 405. The rim space 470 may be provided with a suitable seal to mitigate the escape of vapors between the rim 410 and the tank shell 405.

The device further comprises a foam dam attachment or foam dam attachment means 465 for attaching a foam dam 415 to the device. The foam dam 415 partially defines a volume between the fluid tank shell 405 and the foam dam 415. In one exemplary embodiment, the foam dam attachment or foam dam attachment means 465 is an upwardly facing trough 315a. In further exemplary embodiments, the foam dam attachment means 465 comprises both an upwardly facing trough 315a and a downwardly facing trough 315b. In this arrangement, a foam dam 415 may be releasably attached at the periphery of the floating roof.

The foam dam 415 defines a volume between the fluid tank shell 405 and the foam dam 415 for containing foam. The volume may be permanently filled with foam during an emergency situation, such as if a fire develops at a periphery of the internal floating roof 100.

In one exemplary embodiment, the foam dam 415 comprises a base 450 having through apertures. The base 450 is attached at the upwardly facing trough 315a by one or more T-bolt 435 and nut 440 arrangements. The T-bolt 435 and nut 440 arrangements are engaged within the upwardly facing 315a trough and extend through the apertures of the base 450. In this arrangement, the foam dam 415 may be releasably connected at a periphery of the device 400 in a quick and simple manner.

The foam dam 415 is, in an exemplary embodiment, inclined at an angle of 30 degrees to the fluid tank shell but may be inclined at an angle of between 20 degrees and 70 degrees to the fluid tank shell.

The rim attachment or rim attachment means 460 is an outwardly facing trough 465. The outer rim 410 has an outer rim height and the outer rim height is greater than the floating roof height. In this arrangement, a seal may be provided between the outer rim 410 and the fluid tank shell 405.

The outer rim 410 comprises inwardly projecting and substantially horizontal flanges 420 attached at distal edges of the outer rim 410. The flanges 420 provide rigid lateral support for the outer rim 410 and prevent the distortion of the rim during use.

Each trough 315, 465 is configured to engage one or more threaded T-bolts 435 by insertion in a first orientation, then rotation to a second mechanical interlock orientation and securement with a complimentary threaded nut 440. Each trough 315, 465 comprises an opening having an opening width and an interior having an interior width, the opening width being less than the interior width to provide lips 345 for engaging the one or more T-bolts 435. In this arrangement, the troughs 315, 465 are configured for the simple yet secure connection of one or more T-bolts.

Figure 5A:
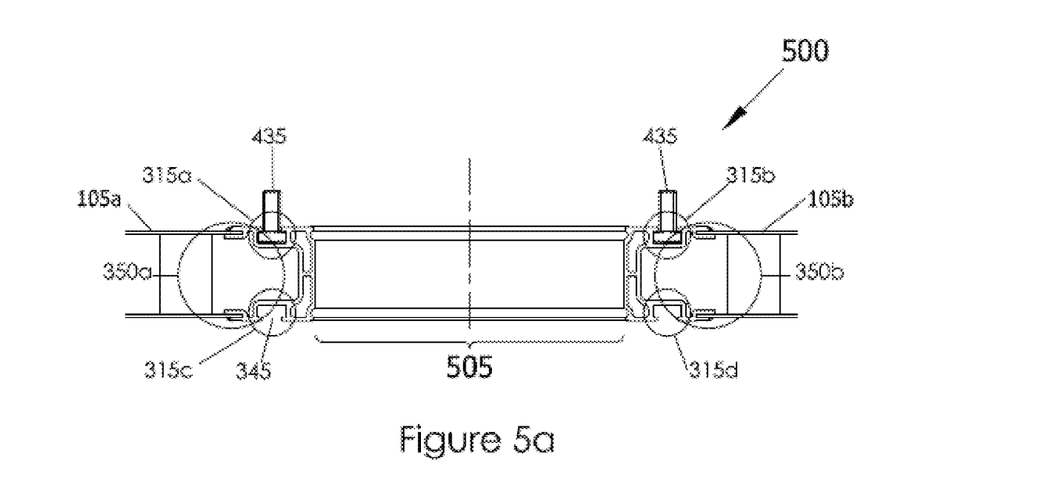
FIG. 5a is a fragmentary, cross-sectional view of a panel aperture bracket for an internal floating roof of a fluid tank in accordance with another exemplary embodiment of the present invention.

FIG. 5a shows a panel aperture bracket 500 for an internal floating roof 100 of a fluid tank. The panel aperture bracket 500 defines an aperture 505 through the floating roof 100. The panel aperture bracket 500 comprises a peripheral trough (315a, 315b or 315c, 315d) adapted for releasably securing one or more fasteners or fastening means 435 at more than one points along the peripheral trough (315a, 315b or 315c, 315d) about the aperture 505. In this manner, the panel aperture bracket 500 advantageously provides an attachment or attachment means for attaching one or more items to the internal floating roof 100, particularly in the exemplary embodiments described below.

In order to aid the attachment, in one exemplary embodiment, the peripheral trough (315a, 315b or 315c, 315d) comprises an opening having an opening width and an interior having an interior width, the opening width being smaller than the interior width to provide at least one lip 345 for engaging the fasteners or fastening means 535. In one preferred exemplary embodiment, the panel aperture bracket 500 has an upper surface comprising an upper peripheral trough 315a, 315b and a lower surface comprising a lower peripheral trough 315c, 315d.

In a further preferred exemplary embodiment, the panel aperture bracket 500 is substantially rectangular. However, other shapes and configurations of panel aperture bracket 500 may be used depending on the application, such as square, circular, triangular and the like.

In order for attachment of the panel aperture bracket 500 to a panel 105, the panel aperture bracket 500 comprises at least one panel retainer or retaining means 350, the panel retainer or retaining means 350 comprising a substantially C-shaped section for receiving the panel 105 therein.

In certain applications, it may be desirable to provide a support or support means for preventing the floating roof 100 from contacting the floor of the fluid tank when the fluid within the tank is depleted. For example, the support or support means may comprise a support attached to the floor of the fluid tank and a support contact on the floating roof. When the floating roof 100 falls to the height of the support, the support contacts the contact surface of the floating roof 100 and prevents the floating roof 100 from falling any further.

Figure 5B:
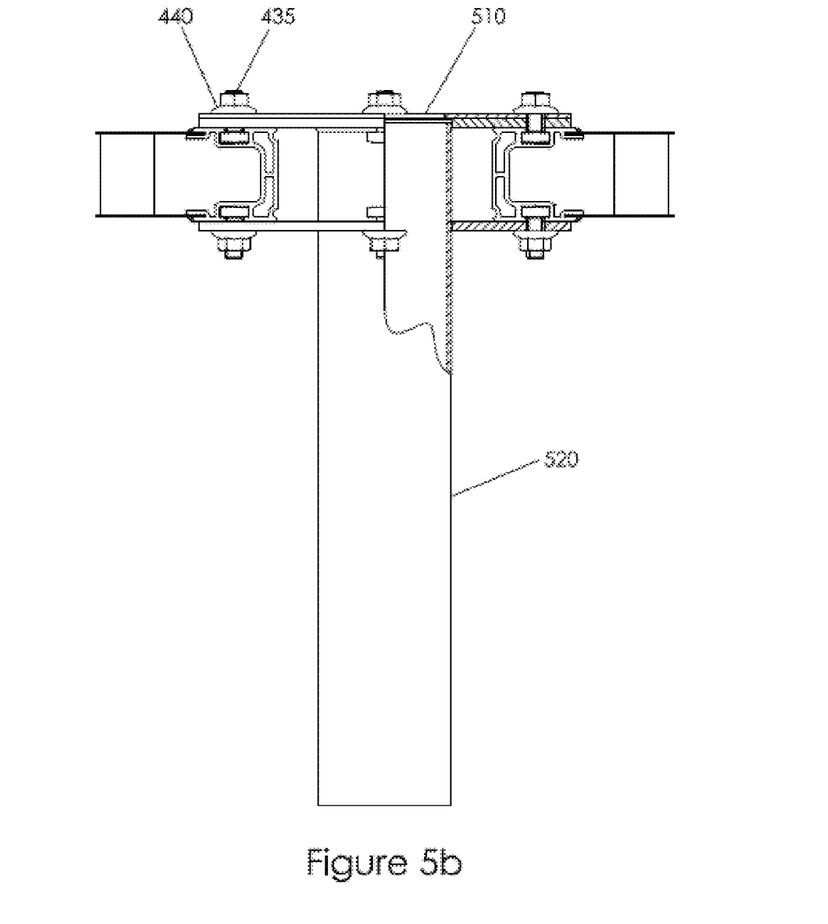
FIG. 5b is a fragmentary, cross-sectional view of the panel aperture bracket of FIG. 5a comprising a support sleeve for receiving a portion of a floating roof support in accordance with another exemplary embodiment of the present invention.

FIG. 5b shows the panel aperture bracket 500 comprising a support sleeve 520 for receiving a portion of a floating roof support (not shown). In this manner, the support sleeve 520 may guide and secure the support to the support contact surface. The support sleeve 520 may be attached to the panel aperture bracket 500 by the one or more fasteners or fastening means 435 engaged in the peripheral trough (315a, 315b or 315c, 315d).

In another exemplary embodiment, the panel aperture bracket 500 further comprised a plate 510 adapted to seal the aperture 505, the plate 510 being attached to the panel aperture bracket by the one or more fasteners or fastening means 435 engaged in the peripheral trough (315a, 315b or 315c, 315d).

In another exemplary embodiment, the panel aperture bracket 500 further comprises a lid (not shown) adapted to selectively seal the aperture 505. The lid may be hingedly attached to the panel aperture bracket 500 by the one or more fasteners or fastening means 435 engaged in the peripheral trough (315a, 315b or 315c, 315d).

The panel aperture bracket 500 is arranged substantially in the same plane as the one or more floating roof panels 105. In one exemplary embodiment, the one or more fasteners or fastening means 435 are threaded T-bolts, inserted in the respective trough 315a, 315b, 315c, 315d in a first orientation, then rotated to a second mechanical interlock orientation and secured with complimentary threaded nuts 440.

Figure 6:
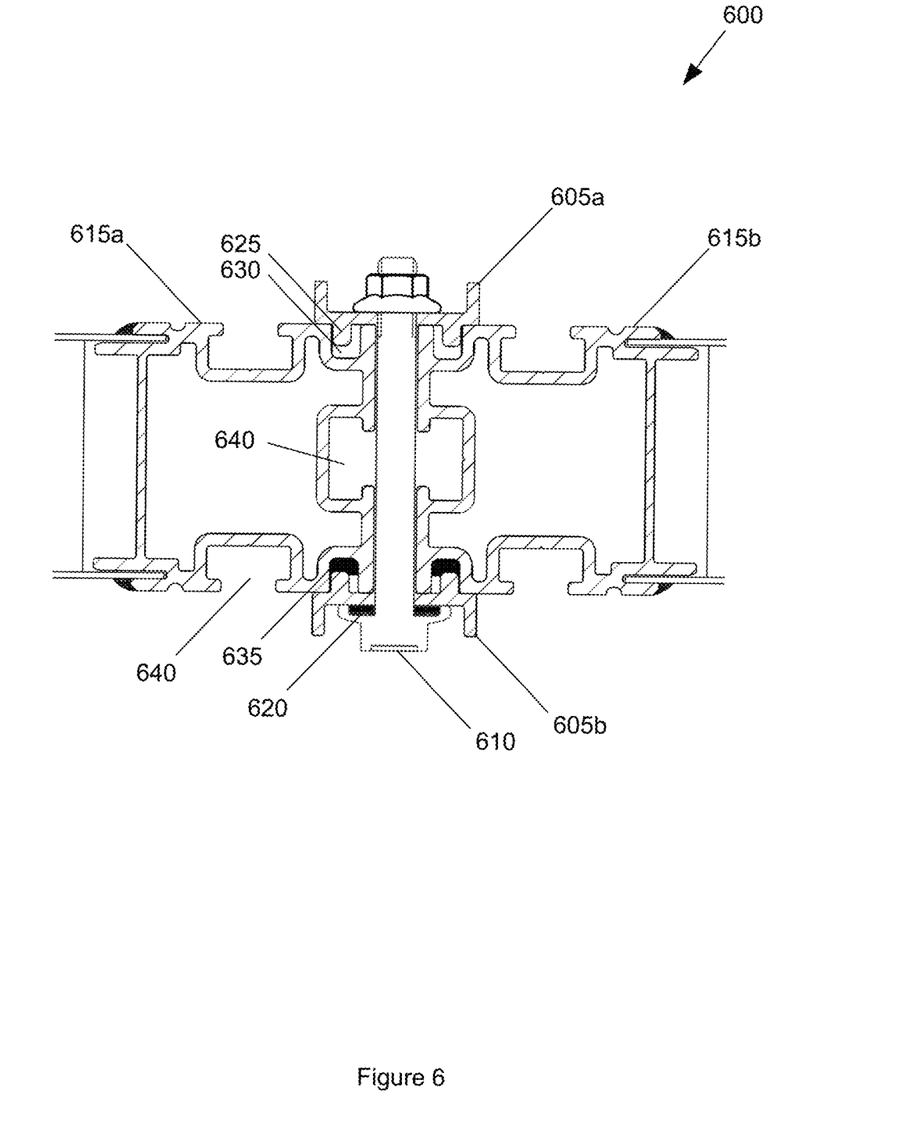
FIG. 6 an enlarged, fragmentary, cross-sectional view of roof panels joined by a batten joint in accordance with another exemplary embodiment of the present invention.

FIG. 6 shows a magnified perspective view of one exemplary embodiment by which the roof panels 105 are joined by a batten joint 600.

The batten joint 600 comprises first and second panel retainers or retaining means 615 and upper and lower battens 605 bearing against the panel retainer or retaining means 615. The first and second panel retainers or retaining means 615 are spaced apart in a non-abutting-type arrangement to advantageously be configurable to account for manufacture tolerances and the like, as described in further detail below.

In one exemplary embodiment, the battens 605 are secured by way of fasteners or fastening means 610, given as a nut and bolt-type arrangement in FIG. 6. As can be seen from FIG. 6, in one exemplary embodiment, the fasteners or fastening means 610 is disposed at least partially between the first and second panel retainers or retaining means 615.

Each batten 605 comprises a pair of lengthwise ribs 625 and each panel retainer or retaining means 615 comprises a respective corresponding rib engagement 630 for receiving a respective rib 625 therein.

In one exemplary embodiment, the corresponding rib engagement 630 is sized to allow for the moveable reception of a respective rib 625 therein. Such an arrangement advantageously allows for manufacturing tolerances to be accounted for. Specifically, as the roof panel 100 comprises a number of adjacent roof panels 105, the spacing between each first and second panel retainers or retaining means 615 may be adjusted to allow for the overall dimensions of the roof panel 100 to be configured with precision. In the exemplary embodiment given in FIG. 6, the at least one respective corresponding rib engagement 630 is a groove.

In one exemplary embodiment, there is provided a gasket 635 between each rib 625 and corresponding rib engagement 630 to prevent the seepage of fluid. The gasket 635 is typically provided across the width of the rib engagement 630 to allow for the moveable engagement of the respective rib 625 without compromising the seal.

In one exemplary embodiment, the gasket 635 is only provided at the upper rib engagement 630a while the lower rib engagement 630b allows the seepage of fluid therein. In this manner, any fluid trapped within the batten joint 600 is allowed to drain from the batten joint 600 so as not to create a hazard. In this exemplary embodiment, the lower battens 605b, may be spaced apart to as to allow for the egress of fluid.

Each panel retainer or retaining means 615 further comprises and edgewise engagement device or edgewise engagement means 640 such that each panel retainer or retaining means 615 may be utilized for other applications, such as the device 400 described above having the foam dam attachment or foam dam attachment means 465 for attaching the foam dam 415 to the device 400. Furthermore, each panel retainer or retaining means 615 may further comprise upper and lower troughs 645 for fastener engagement, such as providing a clamping surface for further clamping collocated panel retainer or retaining means 615.

The term 'fluid', as used throughout this specification, may refer to a liquid, vapor or a combination of liquid and vapor.

Reference throughout this specification to "one embodiment" or "an embodiment" or "an exemplary embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that, in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents, which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims which follow and in the preceding description of the invention, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

It is apparent from the above, that the arrangements described are applicable to the fluid tank industry.

What is claimed is:

1. A batten joint for an internal floating roof of a fluid tank, the floating roof including at least a first panel having a first panel edge and a second panel having a second panel edge, the batten joint comprising:
   a first panel retainer adapted for securely retaining the first panel edge,
   a second panel retainer adapted for securely retaining the second panel edge; and
   at least one batten configured for engaging the first panel retainer and the second panel retainer to variably adjust a position of the first panel relative to a position of the second panel, while the first panel edge and the second panel edge are securely retained by the first panel retainer and the second panel retainer respectively, and while the first panel retainer and the second panel retainer are coupled to the batten, to thereby allow the overall dimensions of the internal floating roof to change with precision.

2. The batten joint according to claim 1, wherein:
   the batten joint has an upper surface and a lower surface; and
   the at least one batten is two battens comprising a first batten disposed at the upper surface of the batten joint and a second batten disposed at the lower surface of the batten joint.

3. The batten joint according to claim 1, further comprising a fastener operable to bear the at least one batten against the first and second panel retaining means.

4. The batten joint according to claim 3, wherein the fastener is disposed at least partially between the first and second panel retaining means.

5. The batten joint according to claim 3, wherein the fastener is provided with at least one gasket operable to prevent seepage of fluid between the first and second panel retaining means.

6. The batten joint according to claim 1, wherein:
   the at least one batten comprises at least one lengthwise rib; and
   the first and second panel retaining means comprises at least one respective corresponding rib engagement operable to receive the at least one lengthwise rib therein.

7. The batten joint according to claim 6, wherein the at least one respective corresponding rib engagement is sized to allow for moveable reception of the at least one lengthwise rib therein.

8. The batten joint according to claim 6, wherein:
   the at least one lengthwise rib has a given width; and
   the at least one respective corresponding rib engagement has a width greater than the given width.

9. The batten joint according to claim 6, wherein the at least one respective corresponding rib engagement is a groove.

10. The batten joint according to claim 6, wherein the at least one lengthwise rib is a pair of lengthwise ribs.

11. The batten joint according to claim 1, wherein the at least one batten comprises at least one lengthwise rib, and further comprising a gasket disposed between the at least one lengthwise rib and the at least one respective corresponding rib engagement.

12. In a fluid tank with a floating roof having at least a first panel having a first panel edge and a second panel having a second panel edge, a roof batten joint comprising:
   a first panel retainer operable to retain the first panel edge;
   a second panel retainer operable to retain the second panel edge; and
   at least one batten engaging the first and second panel retainers in a spaced apart configuration, whereby the batten is configured to allow adjustment of the position of the first panel retainer relative to the second panel retainer while the first panel retainer and the second panel retainer are coupled to the batten to thereby change overall dimensions of the floating roof to fit precisely within the fluid tank.

13. The batten joint according to claim 12, wherein:
   the batten joint has an upper surface and a lower surface; and
   the at least one batten is two battens comprising a first batten disposed at the upper surface of the batten joint and a second batten disposed at the lower surface of the batten joint.

14. The batten joint according to claim 12, further comprising a fastener disposed at least partially between the first and second panel retainers and operable to bear the at least one batten against the first and second panel retainers.

15. The batten joint according to claim 14, wherein the fastener is provided with at least one gasket operable to prevent seepage of fluid between the first and second panel retainers.

16. The batten joint according to claim 12, wherein:
   the at least one batten comprises at least one lengthwise rib; and
   the first and second panel retainers comprise at least one respective corresponding rib engagement operable to receive the at least one lengthwise rib therein and sized to allow for moveable reception of the at least one lengthwise rib therein.

17. The batten joint according to claim 16, wherein:
   the at least one lengthwise rib has a given width; and
   the at least one respective corresponding rib engagement has a width greater than the given width.

18. The batten joint according to claim 16, wherein the at least one respective corresponding rib engagement is a groove.

19. The batten joint according to claim 12, wherein the at least one batten comprises at least one lengthwise rib, and further comprising a gasket disposed between the at least one lengthwise rib and the at least one respective corresponding rib engagement.

20. In combination with a floating roof of a fluid tank, the floating roof having at least a first panel having a first panel edge and a second panel having a second panel edge, a roof batten joint comprising:
   a first panel retainer secured to the first panel edge in an airtight fashion;
   a second panel retainer secured to the second panel edge in an airtight fashion; and
   at least one batten engaging the first and second panel retainers in a spaced apart configuration, the batten engaging one or more of the first panel retainer and the second panel retainer to variably adjust a position of the first panel retainer relative to the second panel retainer while the first panel edge and the second panel edge are secured to the first panel retainer and the second panel retainer respectively, and while the first panel retainer and the second panel retainer are coupled to the batten, to thereby change overall dimensions of the floating roof to fit within internal dimensions of the fluid tank.

* * * * *